(12) United States Patent
Gu et al.

(10) Patent No.: US 12,049,560 B2
(45) Date of Patent: Jul. 30, 2024

(54) HEAT-RESISTANT SEMI-CONDUCTIVE THERMOPLASTIC RESIN COMPOSITION

(71) Applicant: Covestro Deutschland AG, Leverkusen (DE)

(72) Inventors: Jianfeng Gu, Shanghai (CN); Xiaoxiang Wang, Shanghai (CN); Shoujun Li, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 18/546,107

(22) PCT Filed: Feb. 25, 2021

(86) PCT No.: PCT/CN2021/077870
§ 371 (c)(1),
(2) Date: Aug. 11, 2023

(87) PCT Pub. No.: WO2022/178755
PCT Pub. Date: Sep. 1, 2022

(65) Prior Publication Data
US 2024/0043683 A1    Feb. 8, 2024

(51) Int. Cl.
*C08K 3/013* (2018.01)
*C08K 3/04* (2006.01)
*C08L 67/02* (2006.01)

(52) U.S. Cl.
CPC ............ *C08L 67/02* (2013.01); *C08K 3/013* (2018.01); *C08K 3/04* (2013.01); *C08K 2201/001* (2013.01); *C08K 2201/006* (2013.01); *C08L 2201/08* (2013.01)

(58) Field of Classification Search
USPC ................................................. 528/271, 272
See application file for complete search history.

(56) References Cited

U.S. PATENT DOCUMENTS

| | | |
|---|---|---|
| 2,465,319 A | 3/1949 | Whinfield et al. |
| 3,047,539 A | 7/1962 | Pengilly |
| 3,419,634 A | 12/1968 | Vaughn, Jr. |
| 3,553,167 A | 1/1971 | Schnell et al. |
| 3,953,394 A | 4/1976 | Fox et al. |
| 4,075,173 A | 2/1978 | Maruyama et al. |
| 4,311,823 A | 1/1982 | Imai et al. |
| 4,334,053 A | 6/1982 | Freitag et al. |
| 4,584,360 A | 4/1986 | Paul et al. |
| 6,127,492 A | 10/2000 | Nagashima et al. |
| 2013/0153832 A1 | 6/2013 | Moniruzzaman |
| 2014/0197367 A1 | 7/2014 | Kumanan et al. |

FOREIGN PATENT DOCUMENTS

| | | | |
|---|---|---|---|
| DE | 2232877 A1 | 1/1974 | |
| DE | 3007934 A1 | 9/1981 | |
| DE | 3832396 A1 | 2/1990 | |
| EP | 0428042 A | 5/1991 | |
| EP | 0428042 A2 * | 5/1991 | |
| EP | 1992663 A1 * | 11/2008 | ............... C08K 9/08 |
| EP | 1992663 A1 | 11/2008 | |
| GB | 1552558 A | 9/1979 | |

OTHER PUBLICATIONS

H. Schnell, "Chemistry and Physics of Polycarbonates", Interscience Publishers, 1964.
International Search Report PCT/CN2021/077870, date of mailing: Jul. 23, 2021, Authorized officer: Francis Adigbli.

* cited by examiner

*Primary Examiner* — Terressa Boykin
(74) *Attorney, Agent, or Firm* — John E. Mrozinski, Jr.

(57) ABSTRACT

The present application relates to a heat-resistant semi-conductive thermoplastic resin composition and shaped articles made therefrom. The thermoplastic resin composition comprises the following components: an aromatic polycarbonate, a polyalkylene terephthalate, a conductive carbon black and a reinforcement material. The shaped article made from the thermoplastic resin composition according to the present invention has a good combination of heat-resistance, semi-conductivity and dimensional stability.

15 Claims, No Drawings

HEAT-RESISTANT SEMI-CONDUCTIVE THERMOPLASTIC RESIN COMPOSITION

CROSS REFERENCE TO RELATED APPLICATION

This application is a national stage application under 35 U.S.C. § 371 of PCT/CN2021/077870, filed Feb. 25, 2021, which is incorporated herein by reference in its entirety.

TECHNICAL FIELD

The present invention relates to a polymer composition. In particular, the present invention relates to a heat-resistant semi-conductive thermoplastic resin composition and shaped articles made therefrom.

BACKGROUND ART

Semi-conductive thermoplastic resins are widely used as packaging material for sensitive electronic devices, for example a tray, in integrated circuit (IC) industry. Because of their low electrical conductivity, neat thermoplastics with a surface electrical resistance in the level of >E15 (ohm/sq), can accumulate static charge which has high risk to damage the IC parts (such as chips, wafers, semiconductor devices, electronic parts or information recording media) during the packaging and transportation process. Normally, the surface electrical resistance of material for IC tray application is lower than E9 ohm/sq. The conventional ways to achieve such an electrical resistance is either to use inherent conductive polymers (ICP) or to add conductive fillers into the non-conductive thermoplastics.

During packaging process of IC parts, water or solvent bond solder is used. Therefore, the remained moistures or volatile organic compounds (VOC) must be removed; otherwise, they will cause cracking and blistering issue and the IC parts will be damaged. However, as the high efficient of IC industry development, the time needed for drying of IC parts is shortened, a high temperature of drying for example 150° C. or more is required. The normal practice is to heat the chip together with the tray at a temperature in the range of 140° C.-150° C. for 6-24 hours. This requires the tray not only to be electrical conductive but also can sustain a heating process of high temperature for a specific long time without losing its original shape and dimension accuracy.

The commonly used thermoplastic resins for this application are polyphenylene oxide (PPO), polyphenylene sulfide (PPS), and the like with high glass transition temperature.

For instance, U.S. Pat. No. 6,127,492A discloses a thermoplastic resin composition comprising 5 to 45 parts by weight of carbon fiber, 0.1 to 10 parts by weight of conductive carbon black and 100 parts by weight of an aromatic polycarbonate resin and an aromatic polysulfone resin with excellent in heat-resistance and mechanical strength.

US2013153832A discloses a thermoplastic electrostatic dissipative (ESD) composite comprising a thermoplastic resin phase and a plurality of intermediate modulus carbon fibers dispersed within the thermoplastic resin phase. Polycarbonate is mentioned as a suitable thermoplastic resin.

US2014197367A discloses a thermoplastic electrostatic dissipative (ESD) composite comprising a thermoplastic resin phase and a filler composition comprising a conductive carbon black and a non-conductive polymer dispersed within the thermoplastic resin phase. The thermoplastic resin can be polycarbonate and PBT.

Aromatic polycarbonate resin has excellent mechanical strength and dimensional accuracy. However, it has a Tg lower than 150° C.

Nevertheless, for a thermoplastic resin composition to be suitable for use in IC tray applications, it is desired that said thermoplastic resin composition has good heat-resistance and dimensional stability as well as excellence semi-conductive property.

Until now, no tray made from a composition of polymers with Tg lower than 150° C. has been satisfactory in terms of heat-resistance, dimensional stability and semi-conductive property.

Therefore, there remains a need in the art for a thermoplastic resin composition with a good combination of heat-resistance, semi-conductivity and dimensional stability.

SUMMARY OF THE INVENTION

Thus, an object of the present invention is to provide a thermoplastic resin composition with a good combination of heat-resistance, semi-conductivity and dimensional stability.

Another object of the present invention is to provide a shaped article made from the thermoplastic resin composition with a good combination of heat-resistance, semi-conductivity and dimensional stability.

It has now been found, surprisingly, that such objects can be achieved by the present invention.

Thus, according to a first aspect, the present invention provides a heat-resistant semi-conductive thermoplastic resin composition comprising, relative to the total weight of the composition:
  A) from 15 wt. % to 30 wt. %, preferably from 15 wt. % to 28 wt. %, more preferably from 16 wt. % to 25 wt. % of an aromatic polycarbonate;
  B) from 40 wt. % to 60 wt. %, preferably from 42 wt. % to 58 wt. %, more preferably from 45 wt. % to 55 wt. % of a polyalkylene terephthalate;
  C) from 10 wt. % to 20 wt. %, from 12 wt. % to 18 wt. %, preferably from 13 wt. % to 16 wt. % of conductive carbon black; and
  D) from 12 wt. % to 20 wt. %, preferably from 15 wt. % to 19 wt. %, more preferably from 15 wt. % to 18 wt. % of a reinforcement material,
    wherein the weight ratio of the polyalkylene terephthalate to the aromatic polycarbonate is from 1.5:1 to 3.5:1, preferably from 2:1 to 3:1.

According to a second aspect, the present invention provides a shaped article made from the heat-resistant semi-conductive thermoplastic resin composition according to the present invention.

According to a third aspect, the present invention provides a method for preparing the shaped article mentioned above, comprising injection moulding, extrusion moulding, blowing moulding process or thermoforming the heat-resistant semi-conductive thermoplastic resin composition according to the present invention.

The inventors have found that the article made from the heat-resistant semi-conductive thermoplastic resin composition according to the present invention has a good combination of heat-resistance, semi-conductivity and dimensional stability. It has potential applications in many areas, for example in IC parts packaging, transportation, and processing, and so on.

Other subjects and characteristics, aspects and advantages of the present invention will be set forth in the description that follows, and in part, will be obvious from the description, or may be learned by practice of the present invention.

The advantages will be realized and attained by means of the elements and combinations particularly pointed in the appended claims. It is to be understood that both the foregoing general description and the following detailed description are exemplary and explanatory only and are not restrictive, as claimed.

DETAILED DESCRIPTION OF THE INVENTION

In that which follows and unless otherwise indicated, the limits of a range of values are included within this range, in particular in the expressions "between . . . and . . . " and "from . . . to . . . ".

Throughout the present application, the term "comprising" is to be interpreted as encompassing all specifically mentioned features as well optional, additional, unspecified ones.

Unless defined otherwise, all technical and scientific terms used herein have the same meaning as commonly understood by one of ordinary skill in the art to which the present invention pertains. When the definition of a term in the present description conflicts with the meaning as commonly understood by those skilled in the art the present invention belongs to, the definition described herein shall apply.

Unless otherwise specified, all numerical values expressing amount of ingredients and the like which are used in the description and claims are to be understood as being modified by the term "about".

All percentages in the present application refer to weight percentage, unless otherwise specified.

Component A

According to the first aspect of the present invention, an aromatic polycarbonate is used in the thermoplastic resin composition as component A.

Suitable aromatic polycarbonates used according to the present invention are known from the literature or may be produced by processes known from the literature (for the production of aromatic polycarbonates see for example Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396.

Aromatic polycarbonates are produced e.g. by the melt process or by reaction of diphenols with carbonic acid halides, preferably phosgene and/or with aromatic dicarboxylic acid dihalides, preferably benzene dicarboxylic acid dihalides, by the phase interface process, optionally using chain stoppers, for example monophenols and optionally using trifunctional or more than trifunctional branching agents, for example triphenols or tetraphenols.

Diphenols for the production of the aromatic polycarbonates are preferably those of the formula (I)

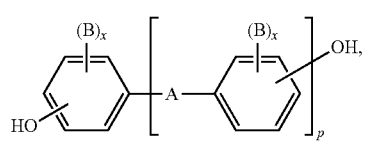

(I)

wherein

A is a single bond, $C_1$-$C_5$-alkylene, $C_2$-$C_5$-alkylidene, $C_5$-$C_6$-cycloalkylidene, —O—, —SO—, —CO—, —S—, —$SO_2$—, $C_6$-$C_{12}$-arylene, onto which further aromatic rings, optionally containing heteroatoms, may be condensed, or a group of the formula (II) or (III)

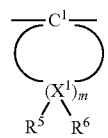

(II)

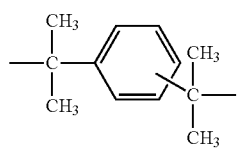

(III)

B is, in each case, $C_1$-$C_{12}$-alkyl, preferably methyl, halogen, preferably chlorine and/or bromine, x in each case, independently of each other, is 0, 1 or 2, p is 1 or 0, and $R^5$ and $R^6$ may be selected individually for each $X^1$, independently of each other, as hydrogen or $C_1$-$C_6$-alkyl, preferably hydrogen, methyl or ethyl, $X^1$ is carbon and m is an integer from 4 to 7, preferably 4 or 5, provided that $R^5$ and $R^6$ are both alkyl on at least one $X^1$ atom.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones and a,a-bis-(hydroxyphenyl)-diisopropyl-benzenes and their ring-brominated and/or ring-chlorinated derivatives.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethyl cyclohexane, 4,4'-dihydroxydiphenyl sulfide, 4,4'-dihydroxydiphenyl-sulfone and their di- and tetrabrominated or chlorinated derivatives such as for example 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-bis-(4-hydroxyphenyl)-propane (bisphenol A) is preferred in particular.

The diphenols may be used individually, or in any mixture.

The diphenols are known from the literature or may be obtained by processes known from the literature.

Suitable chain stoppers for the production of the thermoplastic, aromatic polycarbonates are for example phenol, p-chlorophenol, p-tert-butyl phenol or 2,4,6-tribromophenol, but also long chain alkyl phenols such as 4-(1,3-tetramethylbutyl)-phenol according to DE-OS 2 842 005 or monoalkylphenol or dialkyl phenols containing a total of 8 to 20 C atoms in the alkyl substituents such as 3,5-di-tert-butyl phenol, p-iso-octyl phenol, p-tert-octyl phenol, p-dodecyl phenol and 2-(3,5-dimethylheptyl)-phenol and 4-(3,5-dimethylheptyl)-phenol. The quantity of chain stoppers to be used is generally 0.5 mol. % to 10 mol. %, in relation to the molar sum of the diphenols used in each case.

The thermoplastic, aromatic polycarbonates may be branched in the known way, and preferably by incorporating 0.05 to 2.0 mol. % in relation to the sum of the diphenols used, of trifunctional or more than trifunctional compounds, for example those having three or more phenolic groups.

Both homopolycarbonates and copolycarbonates are suitable. 1 to 25 wt. %, preferably 2.5 to 25 wt. % (in relation to the total quantity of diphenols to be used) of polydiorganosiloxanes with hydroxyaryloxy terminal groups may also be used for the production of copolycarbonates according to Component A of the invention. These are known (see for example U.S. Pat. No. 3,419,634) or may be produced by processes known from the literature. The production of copolycarbonates containing polydiorganosiloxanes is described e.g. in DE-A 3 334 782.

Preferred polycarbonates in addition to the bisphenol A homopolycarbonates are the copolycarbonates of bisphenol A containing up to 15 mol. % in relation to the molar sum of diphenols, of other diphenols mentioned as preferred or particularly preferred, in particular 2,2-bis(3,5-dibromo-4-hydroxyphenyl)-propane.

Aromatic dicarboxylic acid dihalides for the production of aromatic polyestercarbonates are preferably the diacid dichlorides of isophthalic acid, terephthalic acid, diphenylether-4,4'-dicarboxylic acid and naphthaline-2,6-dicarboxylic acid.

Mixtures of diacid dichlorides of isophthalic acid and terephthalic acid in a ratio of 1:20 to 20:1 are preferred in particular.

When producing polyestercarbonates, a carbonic acid halide, preferably phosgene, is also used as a bifunctional acid derivative.

In addition to the monophenols already mentioned, their chlorocarbonic acid esters and the acid chlorides of aromatic monocarboxylic acids, which may optionally be substituted by $C_1$-$C_{22}$-alkyl groups or by halogen atoms, as well as aliphatic $C_2$-$C_{22}$ monocarboxylic acid chlorides are also possible chain stoppers for the production of the aromatic polyestercarbonates.

The quantity of chain stoppers is 0.1 to 10 mol. % in each case, in relation to mols of diphenols in the case of the phenolic chain stoppers, and to mols of dicarboxylic acid dichlorides in the case of the monocarboxylic acid chain stopper.

The aromatic polyestercarbonates may also have aromatic hydroxycarboxylic acids incorporated in them.

The aromatic polyestercarbonates may be either linear or branched in the known way (see also DE-A 2 940 024 and DE-A 3 007 934).

As branching agents it is possible to use e.g. trifunctional or polyfunctional carboxylic acid chlorides, such as trimesic acid trichloride, cyanuric acid trichloride, 3,3'-,4,4'-benzophenone-tetracarboxylic acid tetrachloride, 1,4,5,8-naphthaline tetracarboxylic acid tetrachloride or pyromel-litic acid tetrachloride, in quantities of 0.01 to 1.0 mol. % (in relation to the dicarboxylic acid dichlorides used) or trifunctional or polyfunctional phenols, such as phloroglucinol, 4,6-dimethyl-2,4,6-tri-(4-hydroxyphenyl)-heptene-2,4,4-dimethyl-2,4-6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(444-hydroxyphenyl sopropyl]-phenoxy)-methane, 1,4-bis[4,4'-dihydroxytriphenyl)-methyl-benzene, may be used as branching agents in quantities of 0.01 to 1.0 mol. % in relation to the diphenols used. Phenolic branching agents may be added with the diphenols, acid chloride branching agents may be introduced together with the acid chlorides.

As examples of aromatic polycarbonate, mention can be made to Makrolon® 2408, an aromatic polycarbonate having a weight average molecular weight of about 24,000 g/mol produced from bisphenol A and phosgene, Makrolon@2600 available from Covestro Polymers Co. Ltd, a linear bisphenol A polycarbonate, having a weight-average molecular weight of 26000 g/mol as determined by GPC in dichloromethane with polycarbonate as standard, and Makrolon FS2000, available from Covestro Polymers Co. Ltd, a linear bisphenol A polycarbonate, having a weight-average molecular weight of 20,500 g/mol as determined by GPC in dichloromethane with polycarbonate as standard.

Preferably, the aromatic polycarbonates used according to the present invention have a weight average molecular weight (Mw) of at least 10000 g/mol, preferably of from 20000 g/mol to 320000 g/mol, more preferably from 23000 to 28000 g/mol, particularly preferably from 24000 to 26000 g/mol, determined by GPC in dichloromethane with polycarbonate as standard.

Preferably, the polycarbonate is a linear thermoplastic aromatic polycarbonate. More preferably, the linear thermoplastic aromatic polycarbonate has a weight average molecular weight of from 20,000 to 32,000 g/mol, preferably from 23,000 to 28,000 g/mol, more preferably from 24,000 to 26,000 g/mol, determined by GPC in dichloromethane with polycarbonate as standard.

The thermoplastic aromatic polycarbonates may be used alone or in any mixture.

Advantageously, the aromatic polycarbonate is present in the composition in an amount ranging from 15 wt. % to 28 wt. %, preferably from 16 wt. % to 25 wt. %, relative to the total weight of the thermoplastic resin composition.

Component B

According to the first aspect of the present invention, a polyalkylene terephthalate resin is used in the thermoplastic resin composition as component B.

The polyalkylene terephthalate suitable in the present context include homo-polymeric and copolymeric resins, the molecular structure of which include at least one bond derived from a carboxylic acid, preferably excluding linkages derived from carbonic acid.

The alkylene units of the polyalkylene terephthalates which are suitable for use in the present invention contain from 2 to 5, preferably 2 to 4 carbon atoms. The alkylene units may be straight chains or branched chains.

Preferably, the polyalkylene terephthalate is selected from polyethylene terephthalate, polypropylene terephthalate, polybutylene terephthalate, polyisobutylene terephthalate, polypentyl terephthalate, polyisopentyl terephthalate, and polyneopentyl terephthalate.

More preferably, the polyalkylene terephthalate is selected from polyethylene terephthalate and polybutylene terephthalate.

Most preferably, the polyalkylene terephthalate is polyethylene terephthalate.

These are known resins and may be prepared through condensation or ester interchange polymerization of the diol component with the diacid according to known methods. U.S. Pat. Nos. 2,465,319; 3,953,394 and 3,047,539, all incorporated herein by reference, disclose suitable methods for preparing such resins.

Polyethylene terephthalate characterized by an intrinsic viscosity of at least 0.2 and preferably about at least 0.4 deciliter/gram, as measured by the relative viscosity of an 8% solution in orthochlorophenol in accordance with ASTM D 4603 by Glass Capillary Viscometer at about 25° C., is preferred. The upper limit is not critical but it generally does not exceed about 2.5 deciliters/gram. Especially preferred polyethylene terephthalate are those with an intrinsic viscosity in the range of 0.4 to 1.3 deciliter/gram, preferably of 0.6 to 1.0 deciliter/gram.

Polybutylene terephthalate characterized by a melt volume flow rate (MVR) in the range of 5 to 60 $cm^3/10$ min, preferably in the range of 8 to 20 $cm^3/10$ min, as measured in accordance with ISO 1133-1:2011 (250° C./2.16 kg), is preferred.

As examples of polyalkylene terephthalate useful in the composition according to the present invention, mention can be made to polyethylene terephthalate, such as, PET RT6020 from Indorama Ventures Polymer Germany GmbH, and polybutylene terephthalate, such as, Pocan B 1600 from Lanxess AG Germany.

Advantageously, the polyalkylene terephthalate is present in the composition in an amount ranging from 42 wt. % to 58 wt. %, preferably from 45 wt. % to 55 wt. %, relative to the total weight of the thermoplastic resin composition.

Preferably, the weight ratio of the polyalkylene terephthalate to the aromatic polycarbonate is from 2:1 to 3:1.

Component C

According to the first aspect of the present invention, conductive carbon black is used in the thermoplastic resin composition as component C.

Carbon black is an amorphous form of carbon with a high surface-area-to-volume ratio. Further, carbon black has a chemisorbed oxygen complex (i.e., carboxylic, quinonic, lactonic, phenolic groups and the like) on its surface to varying degrees, depending on the conditions of manufacture. The properties of carbon black such as particle size, structure, and purity can vary depending on the type of carbon black chosen. Carbon black can disperse well within the polymer phase, maintain the integrity of its structure or network, and have a consistent particle size.

Conductive carbon black suitable for the present invention is not particularly limited. Preferred conductive carbon black has a BET Nitrogen Surface Area from 20 $m^2/g$ to 1500 $m^2/g$, preferably from 30 $m^2/g$ to 800 $m^2/g$, more preferably from 40 $m^2/g$ to 200 $m^2/g$ as measured according to ASTM D 3037 (1989). Alternatively, preferred conductive carbon black has an OAN (Oil Absorption Number) from 100 ml/100 g to 800 ml/100 g, preferably from 150 ml/100 g to 350 ml/100 g as measured according to ASTM D2414 (2011).

A non-limiting example of commercially available conductive carbon black includes ENSACO™ 250G, commercially available from the TIMCAL Corporation, USA, VXC605 from Cabot, Ketjenblack EC-300J, commercially available from AkzoNobel and Conductex-7067 Ultra, commercially available from Columbian Chemicals Korean.

Advantageously, the conductive carbon black is present in the composition in amount ranging from 12 wt. % to 18 wt. %, preferably from 13 wt. % to 16 wt. %, relative to the total weight of the thermoplastic resin composition.

Component D

According to the first aspect of the present invention, a reinforcement material is used in the thermoplastic resin composition as component D.

Reinforcement materials suitable for the present invention include mineral fillers and glass fiber, preferably the reinforcement material is mineral filers.

Examples of mineral fillers are mica, talc, wollastonite, barium sulfate, silica, kaolin, titanium dioxide, aluminum hydroxide, magnesium hydroxide, feldspar, asbestos, calcium carbonate, dolomite, vermiculite, attapulgite, bentonite, perlite, pyrophylite or the like.

Preferably, the mineral filler is selected from kaolin, talc, and wollastonite. More preferably, the mineral filler is selected from kaolin and talc.

Preferably, the mineral filler is in platy shape, needle shape or spherical shape.

As examples of mineral filler useful in the thermoplastic resin composition according to the present invention, mention can be made to Talc Ultra 5C from IMI Fabi S.p.A., Kaolin HG90 from KaMin LLC and Wollastonite 4w from Imerys Talc America, Inc.

The glass fiber can be chopped or milled. Preferably, the glass fiber is milled.

The glass fiber may have a round (or circular), flat, or irregular cross-section. Thus, use of fiber with a non-round cross section is possible.

In some preferred embodiments, the glass fiber has a flat cross-section.

Preferably, the diameter of the glass fiber is from 3 to 25 micrometers (μm), more preferably, the diameter of the glass fiber is from 4 to 20 μm, most preferably, the diameter of the glass fiber is from 7 to 17 μm.

Preferably, the glass fibers have a diameter from 10 μm to 16 μm.

As examples of milled glass fiber useful in the thermoplastic resin composition according to the present invention, mention can be made to MF 7980 from Lanxess AG Germany.

Advantageously, the reinforcement material is present in the composition according to the present invention in an amount ranging from 15 wt. % to 19 wt. %, preferably from 15 wt. % to 18 wt. %, based on the total weight of the composition.

Preferably, the weight ratio of the conductive carbon black to the reinforcement material is from 0.6:1 to 1.2:1

Additives

The thermoplastic resin composition according to the present invention may further comprise one or more additives as component E.

Preferably, the additive is selected from (i) heat stabilizers (for example, P-EPQ); (ii) antioxidants such as organic phosphites and phosphonites (for example, STABILIZER 1010); (iii) processing aids; (iv) nucleating agents; (v) internal lubricants and/or external lubricants; (vi) flame retardants; (vii) mold release agents (PETS); and (viii) transesterification inhibitor (Phosphorous acid ($H_3PO_3$)).

The skilled in the art can adjust the amount of the additive as desired.

Advantageously, when one or more than one additional ingredient are present, their total weight, based on the total weight of thermoplastic resin composition, is usually below 5 wt. %, preferably below 3 wt. % and more preferably below 2 wt. %.

In some preferred embodiments, the present invention provides a heat-resistant semi-conductive thermoplastic resin composition comprising, relative to the total weight of the composition:
  A) from 16 wt. % to 25 wt. % of an aromatic polycarbonate;
  B) from 45 wt. % to 55 wt. % of polybutylene terephthalate, polyethylene terephthalate, or a mixture thereof;

C) from 13 wt. % to 16 wt. % of conductive carbon black; and

D) from 15 wt. % to 18 wt. % of a reinforcement material selected from mica, talc, wollastonite, and glass fiber.

The inventors have found that the article made from the heat-resistant semi-conductive thermoplastic resin composition according to the present invention has a good combination of heat-resistance, semi-conductivity and dimensional stability. In particular, the composition according to the present invention has improved Vicat softening temperature for example above 155° C. and HDT for example above 145° C.) as well as excellent surface resistivity no more than E9 ohm/sq.

Preparation of the Thermoplastic Resin Composition

The thermoplastic resin composition according to the present invention can be prepared by mixing of the materials desired in the thermoplastic resin composition in a known manner and subjecting the mixture to melt compounding and melt extrusion at a temperature between 200° C. and 330° C. in conventional units, such as internal kneaders, and twin-screw extruders.

For example, the materials desired in the thermoplastic resin composition are first blended in a high speed mixer. Other low shear processes, including but not limited to hand mixing, can also accomplish this blending.

The blend is then fed into the throat of a twin-screw extruder via a hopper. Alternatively, at least one of the components can be incorporated into the thermoplastic resin composition by feeding directly into the extruder at the throat and/or downstream through a side stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets can be one-fourth inch long or less as described. Such pellets can be used for subsequent molding, shaping or forming.

Melt blending methods are preferred due to the availability of melt blending equipment in commercial polymer processing facilities.

Illustrative examples of equipment used in such melt processing methods include: co-rotating and counter-rotating extruders, single screw extruders, co-kneaders, and various other types of extrusion equipment.

The temperature of the melt in the processing is preferably minimized in order to avoid excessive degradation of the polymers. It is often desirable to maintain the melt temperature between 200° C. and 330° C. in the molten thermoplastic resin composition, although higher temperatures can be used provided that the residence time of the resin in the processing equipment is kept short.

In some embodiments, the melt processed composition exits processing equipment such as an extruder through small exit holes in a die. The resulting strands of the molten resin are cooled by passing the strands through a water bath. The cooled strands can be chopped into small pellets for packaging and further handling.

Shaped Articles

The thermoplastic resin composition according to the present invention can be used, for example for the production of various types of shaped articles.

Thus, according to the second aspect, the present invention provides a shaped article made from the heat-resistant semi-conductive thermoplastic resin composition according to the first aspect of the present invention.

The heat-resistant semi-conductive thermoplastic resin composition according to the present invention can be molded into shaped articles such as, a heat-resistant tray or box for IC chip, housing for electronic device, etc.

The shaped article made from the heat-resistant semi-conductive thermoplastic resin composition according to the present invention has a good combination of heat-resistance, semi-conductivity and dimensional stability.

Preparation of Shaped Articles

According to the third aspect, the present invention provides a method for preparing the shaped article mentioned above, comprising injection moulding, extrusion moulding, blowing moulding process or thermoforming the heat-resistant semi-conductive thermoplastic resin composition according to the present invention.

During preparing shaped articles with the thermoplastic resin composition according to this invention, the melting temperature for the molding process preferably is in the range of 250-350° C., more preferably 270-330° C., even more preferably 280-320° C. The mold temperature could be in the range of 60-100° C., preferably 70-90° C., and the injection pressure can be in the range of 800-2600 bar, and preferably 900-2500 bar.

EXAMPLES

The following examples are put forth so as to provide those of ordinary skill in the art with a complete disclosure and description of how the thermoplastic resin composition disclosed and claimed herein can be made and evaluated, and are intended to be purely exemplary and are not intended to limit the disclosure. Efforts have been made to ensure accuracy with respect to numbers, but some errors and deviations should be accounted for.

Materials Used

Component A

PC: Makrolon® 2408 from Covestro, Ltd., aromatic polycarbonate resin pellets having a weight average molecular weight of about 24,000 g/mol produced from bisphenol A and phosgene.

Component B

PET: PET RT6020 from Indorama Ventures Polymer Germany GmbH, polyethylene terephthalate with an intrinsic viscosity of 0.8 deciliter/gram.

PBT: Pocan B 1600 from Lanxess AG Germany, polybutylene terephthalate with a MVR of 10 $cm^3$/10 min (250° C./2.16 Kg, as measured according to ISO 1133-1:2011).

Component C

Conductive carbon black: VXC605 from Cabot.

Component D

Talc: Ultra 5C from IMI Fabi S.p.A.,

Kaolin: HG90 from KaMin LLC,

Wollastonite: Wollastonite 4w from Imerys Talc America, Inc.,

Glass fiber: MF 7980 from Lanxess AG Germany.

Measurements

The following tests were carried out in the Examples.

Vicat softening temperature was determined (50N; 120 K/h) in accordance with ISO 306:2013 on bars of dimensions 80 mm×10 mm×4 mm.

Heat distortion temperature (HDT) was measured on specimens with dimensions of 80 mm×10 mm×4 mm under a load of 0.45 MPa according to ISO 75-2:2013.

Surface resistivity and volume resistivity were measured on specimens having an edge size of 60 mm and a thickness of 2 mm according to IEC 60093-1989.

Tensile stress at break was measured according to ISO 527-2:2012(50 mm/min) using injection molded test specimens.

Izod unnotched impact strength were measured on specimens with dimensions of 80 mm×10 mm×4 mm at the temperature of 23° C. according to 150180/A:2000 (23° C., 4 mm, 11J).

Warpage of specimens was visually evaluated as follows: the deformation of the molded plate was measured and graded according the degree of deformation, wherein ++++ stands for no deformation, +++ stands for slight deformation, and ++ stands for acceptable deformation, + stands for serious and unacceptable deformation.

Inventive Examples 1-7 and Comparative Examples 1-5

The heat-resistant semi-conductive thermoplastic resin compositions of inventive examples 1-7 (Ex 1-Ex 7) and comparative examples 1-5 (CEx 1-CEx 5) containing the components as shown in Tables 1-2 were prepared in the form of granules on a ZSK25 twin-screw extruder from Coperion, Werner and Pfleiderer (Germany) at a speed of 300 rpm and at a machine barrel temperature of 260-290° C., with a throughput of 30 kg/h.

Test bars were prepared on the injection moulding machine with a melt temperature of 260° C., a mold temperature of 80° C., a flow front velocity of 240 mm/s with the granules obtained for each composition.

Vicat softening temperature, HDT, surface resistivity, volume resistivity, tensile stress at break, Izod unnotched impact strength, warpage of the specimens were characterized and the results were summarized in Tables 1-2.

TABLE 1

|   |   | Unit | CEx 1 | CEx 2 | CEx 3 | Ex 1 | Ex 2 | Ex 3 |
|---|---|---|---|---|---|---|---|---|
| Components ||||||||
| A | PC | wt. % | 51.03 | 45.38 | 34.02 | 22.66 | 17.01 | 22.66 |
| B | PET | wt. % | 17.01 | 22.66 | 34.02 | 45.38 | 51.03 | — |
|   | PBT | wt. % | — | — | — | — | — | 45.38 |
| C | Conductive Carbon Black | wt. % | 16 | 16 | 16 | 16 | 16 | 16 |
| D | Talc | wt. % | 15 | 15 | 15 | 15 | 15 | 15 |
| E | Phosphorous acid ($H_3PO_3$) | wt. % | 0.06 | 0.06 | 0.06 | 0.06 | 0.06 | 0.06 |
|   | FACI L348 (PETS) | wt. % | 0.6 | 0.6 | 0.6 | 0.6 | 0.6 | 0.6 |
|   | STABILIZER P-EPQ | wt. % | 0.1 | 0.1 | 0.1 | 0.1 | 0.1 | 0.1 |
|   | STABILIZER 1010 | wt. % | 0.2 | 0.2 | 0.2 | 0.2 | 0.2 | 0.2 |
| Properties ||||||||
| Vicat softening temperature | | ° C. | 143 | 146 | 156 | 176 | 189 | 157 |
| HDT | | ° C. | 127 | 129 | 137 | 152 | 168 | 161 |
| Surface resistivity | | ohm/sq | 1.15E+03 | 8.70E+02 | 7.50E+02 | 8.16E+02 | 9.15E+02 | 5.22E+02 |
| Volume resistivity | | ohm·cm | 5.32E+01 | 4.62E+01 | 3.90E+01 | 4.70E+01 | 3.84E+01 | 1.50E+01 |
| Tensile stress at break | | MPa | — | — | — | 69.9 | — | 55.2 |
| Izod unnotched impact strength | | kJ/m$^2$ | — | — | — | 22 | — | 14 |

Table 1 illustrates the effect of PET/PC weight ratio on the heat resistance of the composition.

Both Vicat softening temperature and HDT increased with increased the weight ratio of PET to PC, as demonstrated by a comparison between Ex 2 and Ex1.

When the amount of PET was smaller than that of PC, HDT of the samples was not higher than 137° C., as demonstrated in CEx 1-CEx 3. When the amount of PET was larger than that of PC, as demonstrated in Ex 1 (PET:PC=2:1) and Ex 2 (PET:PC=3:1), HDT of the samples is higher than 145° C., even up to 168° C.

As compared with samples obtained with PBT and PC (Ex 3), the sample obtained with PET and PC (Ex 1) has higher Vicat softening temperature, tensile stress at break and Izod unnotched impact strength.

TABLE 2

| | | Unit | CEx 4 | CEx 5 | Ex 1 | Ex 4 | Ex 5 | Ex 6 | Ex 7 |
|---|---|---|---|---|---|---|---|---|---|
| | | | Components | | | | | | |
| A | PC | wt. % | 27.68 | 28.02 | 22.66 | 22.66 | 22.66 | 22.66 | 23.68 |
| B | PET | wt. % | 53.36 | 56.02 | 45.38 | 45.38 | 45.38 | 45.38 | 47.36 |
| C | Conductive Carbon Black | wt. % | 16 | — | 16 | 16 | 16 | 16 | 13 |
| D | Talc | wt. % | — | 15 | 15 | — | — | — | 15 |
| | Kaolin | wt. % | — | — | — | 15 | — | — | — |
| | Wollastonite | wt. % | — | — | — | — | 15 | — | — |
| | Glass fibre | wt. % | — | — | — | — | — | 15 | — |
| E | Phosphorous acid ($H_3PO_4$) | wt. % | 0.06 | 0.06 | 0.06 | 0.06 | 0.06 | 0.06 | 0.06 |
| | FACI L348 (PETS) | wt. % | 0.6 | 0.6 | 0.6 | 0.6 | 0.6 | 0.6 | 0.6 |
| | STABILIZER P-EPQ | wt. % | 0.1 | 0.1 | 0.1 | 0.1 | 0.1 | 0.1 | 0.1 |
| | STABILIZER 1010 | wt. % | 0.2 | 0.2 | 0.2 | 0.2 | 0.2 | 0.2 | 0.2 |
| | | | Properties | | | | | | |
| Vicat softening temperature | | ° C. | 164 | 156 | 176 | 174 | 169 | 175 | 171 |
| HDT | | ° C. | 125 | 128 | 152 | 166 | 148 | 148 | 165 |
| Surface resistivity | | ohm/sq | 7.11E+02 | 1.0E+17 | 8.16E+02 | 5.6E+02 | 6.5E+02 | 2.7E+02 | 1.2E+04 |
| Volume resistivity | | ohm · cm | 4.10E+01 | 1.0E+17 | 4.70E+01 | 2.3E+01 | 4.5E+01 | 2.7E+01 | 6.8E+02 |
| Warpage | | | ++++ | +++ | +++ | +++ | ++ | ++ | +++ |

Table 2 illustrates the effect of the addition of fillers and carbon black on the properties of the thermoplastic resin composition obtained.

According to a comparison between Ex 1 and CEx 4, both Vicat softening temperature and HDT increased with the addition of talc.

According to a comparison between Ex 1 and CEx 5, the addition of carbon black increased Vicat softening temperature and HDT.

According to a comparison among Ex 1, Ex 4 and Ex 6, a composition with the highest HDT was obtained when kaolin was used as fillers.

According to a comparison between EX 7 and Ex 1, the surface resistivity and volume resistivity decreased with the increase of the amount of carbon fiber.

It can be seen that the composition according to the present invention has improved Vicat softening temperature (above 155° C.) and HDT (above 145° C.) as well as excellent resistivity (no more than E9 ohm/sq).

The inventors have found that although both Vicat softening temperature and HDT of aromatic polycarbonate and semi-crystalline polyester are low, but the Vicat softening temperature and HDT of the composition comprising them of the present invention are surprising high.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the appended claims.

The invention claimed is:

1. A heat-resistant semi-conductive thermoplastic resin composition comprising, relative to the total weight of the composition:
   A) from 15 to 30 wt. % of an aromatic polycarbonate;
   B) from 40 to 60 wt. % of a polyalkylene terephthalate;
   C) from 10 to 20 wt. % of conductive carbon black; and
   D) from 12 to 20 wt. % of a reinforcement material, wherein the weight ratio of the polyalkylene terephthalate to the aromatic polycarbonate is from 1.5:1 to 3.5:1.

2. The composition according to claim 1, wherein the polyalkylene terephthalate is selected from polyethylene terephthalate, polypropylene terephthalate, polybutylene terephthalate, polyisobutylene terephthalate, polypentyl terephthalate, polyisopentyl terephthalate, and polyneopentyl terephthalate.

3. The composition according to claim 1, wherein the polyalkylene terephthalate is polyethylene terephthalate with an intrinsic viscosity in the range of 0.4 to 1.3 deciliter/gram, as measured in accordance with ASTM D 4603.

4. The composition according to claim 1, wherein the polyalkylene terephthalate is polybutylene terephthalate with an a melt volume flow rate (MVR) in the range of 5 to 60 cm$^3$/10 min, as measured in accordance with ISO 1133-1:2011 (250° C./2.16 kg).

5. The composition according to claim 1, wherein the weight ratio of the polyalkylene terephthalate to the aromatic polycarbonate is from 2:1 to 3:1.

6. The composition according to claim 1, wherein the conductive carbon black has a BET Nitrogen Surface Area from 20 m$^2$/g to 1500 m$^2$/g, as measured according to ASTM D 3037 (1989), or an OAN (Oil Absorption Number) from 100 ml/100 g to 800 ml/100 g, as measured according to ASTM D2414 (2011).

7. The composition according to claim 1, wherein the conductive carbon black is present in the composition in amount ranging from 12 wt. % to 18 wt. %, relative to the total weight of the thermoplastic resin composition.

8. The composition according to claim 1, wherein the reinforcement material is selected from mineral fillers consisting of mica, talc, wollastonite, barium sulfate, silica, kaolin, titanium dioxide, aluminum hydroxide, magnesium hydroxide, feldspar, asbestos, calcium carbonate, dolomite, vermiculite, attapulgite, bentonite, perlite, pyrophylite, and glass fiber.

9. The composition according to claim 1 further comprising one or more selected from (i) heat stabilizers; (ii)

antioxidants; (iii) processing aids; (iv) nucleating agents; (v) internal lubricants and/or external lubricants; (vi) flame retardants; (vii) mold release agents; and (viii) transesterification inhibitor.

10. The composition according to claim 1, wherein the composition has a Vicat softening temperature above 155° C.

11. The composition according to claim 1, wherein the composition has a HDT above 145° ° C.

12. The composition according to claim 1, wherein the composition has a resistivity of no more than E9 ohm/sq.

13. The composition according to claim 1, wherein the weight ratio of the conductive carbon black to the reinforcement material is from 0.6:1 to 1.2:1.

14. A shaped article made from the thermoplastic resin composition according to claim 1.

15. The shaped article according to claim 14, which is a heat-resistant tray or box, or a housing for electronic device.

\* \* \* \* \*